Patented Sept. 26, 1922.

1,430,271

UNITED STATES PATENT OFFICE.

WILLIAM GEORGE WARING, OF WEBB CITY, MISSOURI, ASSIGNOR OF ONE-HALF TO GORDON BATTELLE, OF COLUMBUS, OHIO.

TREATMENT OF ZINC-LEAD FUME.

No Drawing.    Application filed August 17, 1921. Serial No. 493,134.

*To all whom it may concern:*

Be it known that I, WILLIAM GEORGE WARING, a citizen of the United States, residing at Webb City, in the county of Jasper and State of Missouri, have invented certain new and useful Improvements in the Treatment of Zinc-Lead Fume, of which the following is a specification.

This invention relates to the treatment of ore fume; and it comprises a method of purifying and recovering values from oxidized ore fume, etc., containing lead, zinc and other metals, wherein such fume is given a calcination at a low temperature to render soluble any contained cadmium, is then leached to remove the cadmium, and is thereafter treated with ammonium carbonate solution to carbonate the lead and extract the zinc; all as more fully hereinafter set forth and as claimed.

In the treatment of various complex sulfid ores containing lead and zinc, it is common to fume off compounds of these metals from residual, less volatile materials such as silica, and silicates, copper, gold, iron compounds, etc. The fume carries more or less sulfur in various forms. The volatile compounds are collected partly as flue dust and partly as fume, the latter being done in more or less elaborate fume catching devices. Sometimes the fuming off is done in furnaces of the type of the original Scotch hearth, such as the well known Wetherill furnace. Sometimes, the fuming is done in the presence of sufficient air to oxidize the fume and sometimes not. In the latter event, the fume contains sulfids, metals, etc., and is combustible and the collected fume is often ignited and allowed to smoulder, in order to convert it into oxidized compounds, including sulfates. Usually, the fume is collected in bag filters. In this operation, the flue dust and fume of course contain, in addition to the lead and zinc, any other materials or elements which are volatile at the temperatures and under the conditions employed. Sometimes in producing fume, the ore in powdered form is heated to a very high temperature, say 1400° C. or even higher, with or without sufficient air to give an oxidized product. The powdered ore may, for example, be projected into a hot chamber wherein the temperature is kept up by fuel and air. Operating at these very high temperatures, the fume contains, in addition to the lead and zinc, more of other volitilizable bodies than where the operation is at a lower temperature.

It is desirable to treat this fume, whether the oxidized fume directly produced or the burnt fume, by a simple and ready method enabling separation and recovery of the contained values. Such a method is afforded by the present invention.

In this invention, I first submit the fume to a calcination in the presence of air at a very low temperature, say, around 200° C. This expels various impurities, volatile at low temperatures and renders soluble such cadmium as may be present, the cadmium being converted into a readily soluble sulfate. Any suitable type of furnace, such as the well known Brückner furnace, may be employed in this calcination. After this calcination, the material is submitted to a leaching or extraction with water in any convenient manner to remove the cadmium. The cadmium is recovered from the leachings in any convenient manner. The extracted material is washed to such a degree as may be deemed necessary and is then subjected wet to a treatment with an ammonium carbonate solution in the cold for a short time; say, 10 to 15 minutes. The amount of ammonium carbonate used should be enough to convert the lead into carbonate and dissolve the zinc compounds present. It is not desirable to use any large excess above this amount. After this treatment, the lead remains as an insoluble carbonate which is washed and otherwise purified. If the fume is of rather impure character, this lead carbonate may contain antimony, bismuth and silver in substantial amounts and in this event it is best submitted to the ordinary refining methods of producing lead and silver, antimony or bismuth, as the case may be. Where the fume is of a fairly pure character, the lead carbonate so produced may be directly utilized as a pigment. It is in general very fine and has a good covering power when made into paint with oil. The ammoniacal solution containing the zinc, if of impure character, may be passed over metallic zinc, as shot, scrap, etc., to free it of readily reducible metals, as copper, silver, etc. In the event that the preliminary leaching has not taken out all the cadmium, the residue will be here precipitated. In producing zinc compounds for pigmentary purposes, it is quite important to get rid of all the cadmium. The ammoniacal zinc solution, with or without this purifying operation, is next treated to recover the ammonia and also the zinc. This may be done by evaporating down the solution to about half its volume in a suitable still, spray apparatus or the like, provided with ammonia recovery devices. The zinc precipitates as fine, amorphous basic carbonate, which may be separated from the liquid in any suitable way, as by filter pressing, washed and marketed as such. It is very white and fine and has good pigmentary value. It may, of course, be calcined to convert it into the oxid. The liquid residue, after separation of the precipitated zinc compounds, contains ammonium sulfate. If it is not desirable to recover or use the ammonium sulfate as such, this solution may be decomposed with lime to expel the ammonia, which is recovered in suitable ways.

What I claim is:—

1. In the treatment of sulfur-carrying zinc-lead fume of oxidized character, the process which comprises calcining it at about 200° C. to expel volatile constituents and render other constituents soluble and leaching the calcined material to remove the soluble constituents.

2. In the treatment of sulfur-carrying zinc-lead fume of oxidized character, the process which comprises calcining it at about 200° C. to expel volatile constituents and render other constituents soluble, leaching the calcined material to remove the latter constituents and reacting upon the leached material with a solution of ammonuim carbonate.

3. In the purification of sulfur-carrying zinc-lead fume intended for pigmentary purposes, the process which comprises roasting said fume at a low temperature to remove volatile impurities and to render cadmium soluble as sulfate, and leaching with water to extract said cadmium.

In testimony whereof, I have hereunto affixed my signature.

WILLIAM GEORGE WARING.